US012715685B2

(12) United States Patent
Fong

(10) Patent No.: US 12,715,685 B2
(45) Date of Patent: Aug. 25, 2026

(54) WASTE COMPACTOR

(71) Applicant: Louie Fong, San Jose, CA (US)

(72) Inventor: Louie Fong, San Jose, CA (US)

(73) Assignee: Louie Fong, San Jose, CA (US)

( * ) Notice: Subject to any disclaimer, the term of this patent is extended or adjusted under 35 U.S.C. 154(b) by 225 days.

(21) Appl. No.: 18/773,935

(22) Filed: Jul. 16, 2024

(65) Prior Publication Data

US 2025/0361080 A1 Nov. 27, 2025

Related U.S. Application Data

(60) Provisional application No. 63/650,350, filed on May 21, 2024.

(51) Int. Cl.

*B65F 1/14* (2006.01)
*B30B 1/04* (2006.01)
*B30B 9/30* (2006.01)
*B30B 9/32* (2006.01)

(52) U.S. Cl.

CPC .............. *B65F 1/1405* (2013.01); *B30B 1/04* (2013.01); *B30B 9/3042* (2013.01); *B30B 9/3053* (2013.01); *B30B 9/321* (2013.01); *B65F 2210/12* (2013.01)

(58) Field of Classification Search

CPC ........... B30B 1/04; B30B 9/321; B30B 9/322; B30B 9/323; B30B 9/3042; B30B 9/3053; B30B 15/04; B65F 1/1405; B65F 2210/12

See application file for complete search history.

(56) References Cited

U.S. PATENT DOCUMENTS

| | | | | |
|---|---|---|---|---|
| 3,438,322 A * | 4/1969 | Marasco | B65F 1/1405 53/527 |
| 2016/0332405 A1* | 11/2016 | Fryman | B30B 9/323 |

FOREIGN PATENT DOCUMENTS

| | | | | |
|---|---|---|---|---|
| CN | 107297920 A * | 10/2017 | B30B 9/321 |
| GB | 2404570 A * | 2/2005 | B65F 1/1405 |
| GB | 2426430 A * | 11/2006 | B30B 9/3092 |
| GB | 2465410 A * | 5/2010 | B65F 1/1405 |
| GB | 2582390 A * | 9/2020 | B30B 9/3042 |
| NO | 316959 B1 * | 7/2004 | B30B 9/3053 |

OTHER PUBLICATIONS

English translation for GB-2404570 A, 2 pages (Year: 2026).*

* cited by examiner

*Primary Examiner* — Jimmy T Nguyen

(57) ABSTRACT

A waste compactor includes a rod extending in a vertical direction and supported on a ground surface, and a handle rotatably coupled to the rod and configured to rotate about to a central axis of the rod. The handle is also pivotally coupled to the rod and configured to pivot about a pivot axis between a raised position and a lowered position. The pivot axis extends perpendicularly to the central axis. The waste compactor further includes a plunger coupled to the handle and is arranged to move in the vertical direction in response to the pivoting of the handle between the raised position and the lowered position to compress the waste disposed inside the bin.

17 Claims, 4 Drawing Sheets

WASTE COMPACTOR

TECHNICAL FIELD

The present disclosure relates, generally, to a waste compactor. More particularly, the present disclosure pertains to a waster compactor suitable to compact or compress the waste disposed inside a bin.

BACKGROUND

Most householders frequently encounter the challenge of compacting trash in outdoor containers. The need for compacting the trash often arose due to the limited capacity of these containers and the inconvenience of constantly emptying them. Sometimes, householders stomp on the trash to compress it and make more space, which is unhygienic.

SUMMARY

In one aspect of the disclosure, a waste compactor for compacting waste arranged inside a bin is disclosed. The waste compactor includes a rod extending in a vertical direction and supported on a ground surface, and a handle rotatably coupled to the rod and configured to rotate about to a central axis of the rod. The handle is also pivotally coupled to the rod and configured to pivot about a pivot axis between a raised position and a lowered position. The pivot axis extends perpendicularly to the central axis. The waste compactor further includes a plunger coupled to the handle and is arranged to move in the vertical direction in response to the pivoting of the handle between the raised position and the lowered position to compress the waste disposed inside the bin.

In some additional, alternative, or selectively cumulative embodiments, the waste compactor further includes a bracket rotatably coupled to the rod and configured to rotate about the central axis of the rod. The handle is pivotally engaged to the bracket to pivot about the pivot axis.

In some additional, alternative, or selectively cumulative embodiments, the plunger includes a plunger shaft and a plunger plate attached to plunger shaft and arranged to contact and compress the waste arranged inside the bin in response to the pivoting of the handle to the lower position from the raised position.

In some additional, alternative, or selectively cumulative embodiments, the plunger shaft defines a plurality of holes arrayed along a length of the plunger shaft. The plurality of holes enables the coupling of the plunger shaft with the handle and facilitates an adjustment of a length of the plunger shaft extending downwardly of the handle.

In some additional, alternative, or selectively cumulative embodiments, the handle defines a plurality of slots arrayed along a length of the handle to facilitate the coupling of the plunger with the handle. The plurality of slots enables an adjustment of a position of the plunger relative to the rod in a horizontal direction.

In some additional, alternative, or selectively cumulative embodiments, the waste compactor further includes a can crusher assembly to support and crush a can.

In some additional, alternative, or selectively cumulative embodiments, the can crusher assembly includes a retention structure attached to the rod and configured to retain the can in a vertically standing orientation. The can crusher assembly also includes a crusher attached to the handle and configured to move in the vertical direction in response to the pivoting of the handle between the raised position and the lowered position to contact and crush the can positioned on the retention structure.

In some additional, alternative, or selectively cumulative embodiments, the retention structure includes a cantilevered beam extending in a horizontal direction from the rod, and a holder coupled to the beam to hold and retain the can.

In some additional, alternative, or selectively cumulative embodiments, the holder includes a plurality of projections extending in the vertical direction and defining a cavity therebetween to receive and secure the can.

In some additional, alternative, or selectively cumulative embodiments, the waste compactor further includes a base plate to support the rod on the ground surface. The rod is attached to the base plate and extends in the vertical direction from the base plate.

In another aspect of the disclosure, a waste compactor for compacting waste arranged inside a bin is disclosed. The waste compactor includes a rod extending in a vertical direction and supported on a ground surface, and a handle rotatably coupled to the rod and configured to rotate about to a central axis of the rod. The handle is also pivotally coupled to the rod and configured to pivot about a pivot axis between a raised position and a lowered position. The pivot axis extends perpendicularly to the central axis. The waste compactor further includes a plunger coupled to the handle and is arranged to move in the vertical direction in response to the pivoting of the handle between the raised position and the lowered position to compress the waste disposed inside the bin. The waste compactor further includes a can crusher assembly to support and crush a can.

In some additional, alternative, or selectively cumulative embodiments, the waste compactor further includes a bracket rotatably coupled to the rod and configured to rotate about the central axis of the rod. The handle is pivotally engaged to the bracket to pivot about the pivot axis.

In some additional, alternative, or selectively cumulative embodiments, the plunger includes a plunger shaft and a plunger plate attached to plunger shaft and arranged to contact and compress the waste arranged inside the bin in response to the pivoting of the handle to the lower position from the raised position.

In some additional, alternative, or selectively cumulative embodiments, the plunger shaft defines a plurality of holes arrayed along a length of the plunger shaft. The plurality of holes enables the coupling of the plunger shaft with the handle and facilitates an adjustment of a length of the plunger shaft extending downwardly of the handle.

In some additional, alternative, or selectively cumulative embodiments, the handle defines a plurality of slots arrayed along a length of the handle to facilitate the coupling of the plunger with the handle. The plurality of slots enables an adjustment of a position of the plunger relative to the rod in a horizontal direction.

In some additional, alternative, or selectively cumulative embodiments, the can crusher assembly includes a retention structure attached to the rod and configured to retain the can in a vertically standing orientation. The can crusher assembly also includes a crusher attached to the handle and configured to move in the vertical direction in response to the pivoting of the handle between the raised position and the lowered position to contact and crush the can positioned on the retention structure.

In some additional, alternative, or selectively cumulative embodiments, the retention structure includes a cantilevered beam extending in a horizontal direction from the rod, and a holder coupled to the beam to hold and retain the can.

In some additional, alternative, or selectively cumulative embodiments, the holder includes a plurality of projections extending in the vertical direction and defining a cavity therebetween to receive and secure the can.

In some additional, alternative, or selectively cumulative embodiments, the waste compactor further includes a base plate to support the rod on the ground surface. The rod is attached to the base plate and extends in the vertical direction from the base plate.

DETAILED DESCRIPTION

Figure 1:
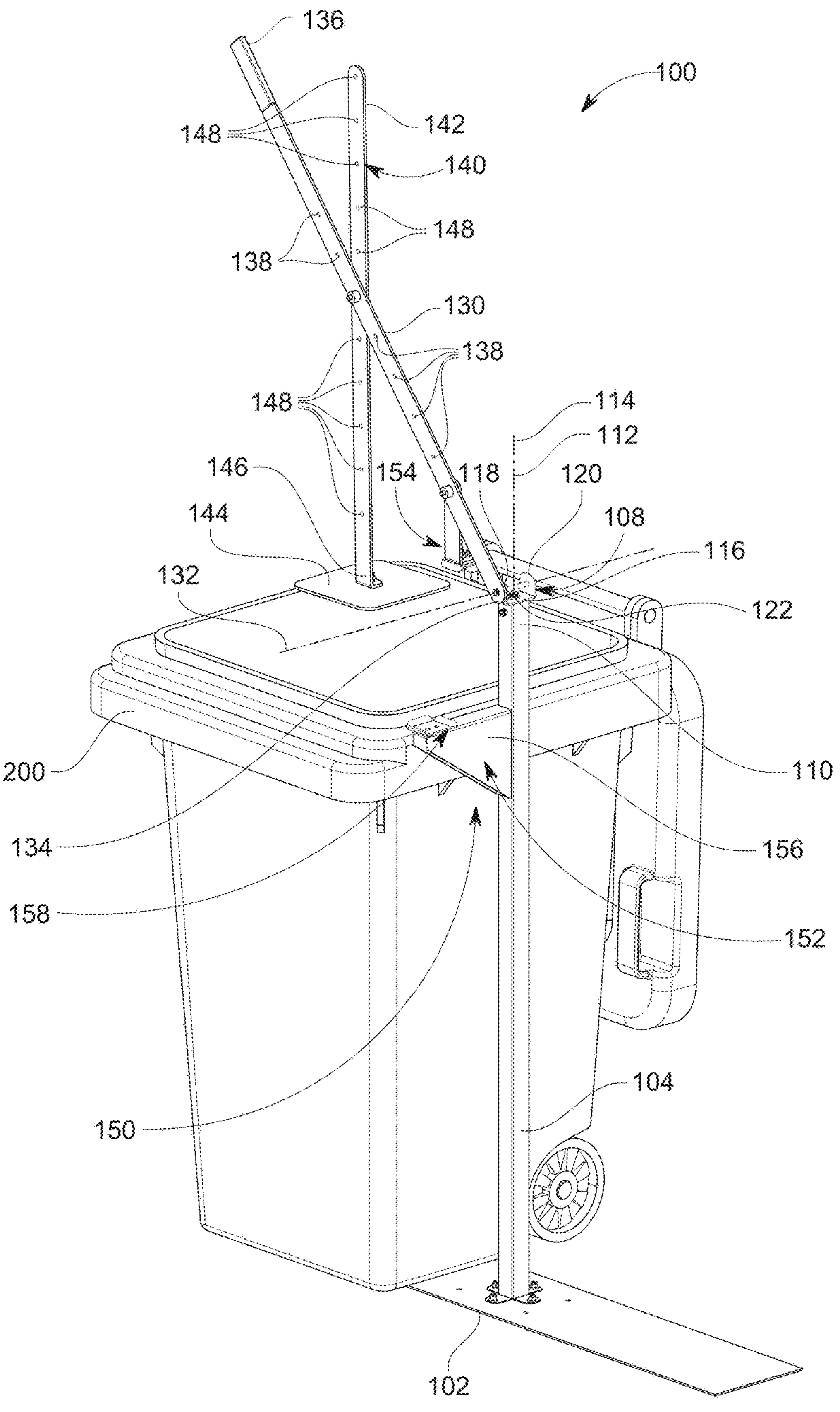
FIG. 1 illustrates a front perspective view of a waste compactor and a bin positioned on a first side of a rod of the waste compactor with a handle of the waste compactor arranged at the first side to compress waste present inside the bin, in accordance with an embodiment of the present disclosure.
Figure 2:
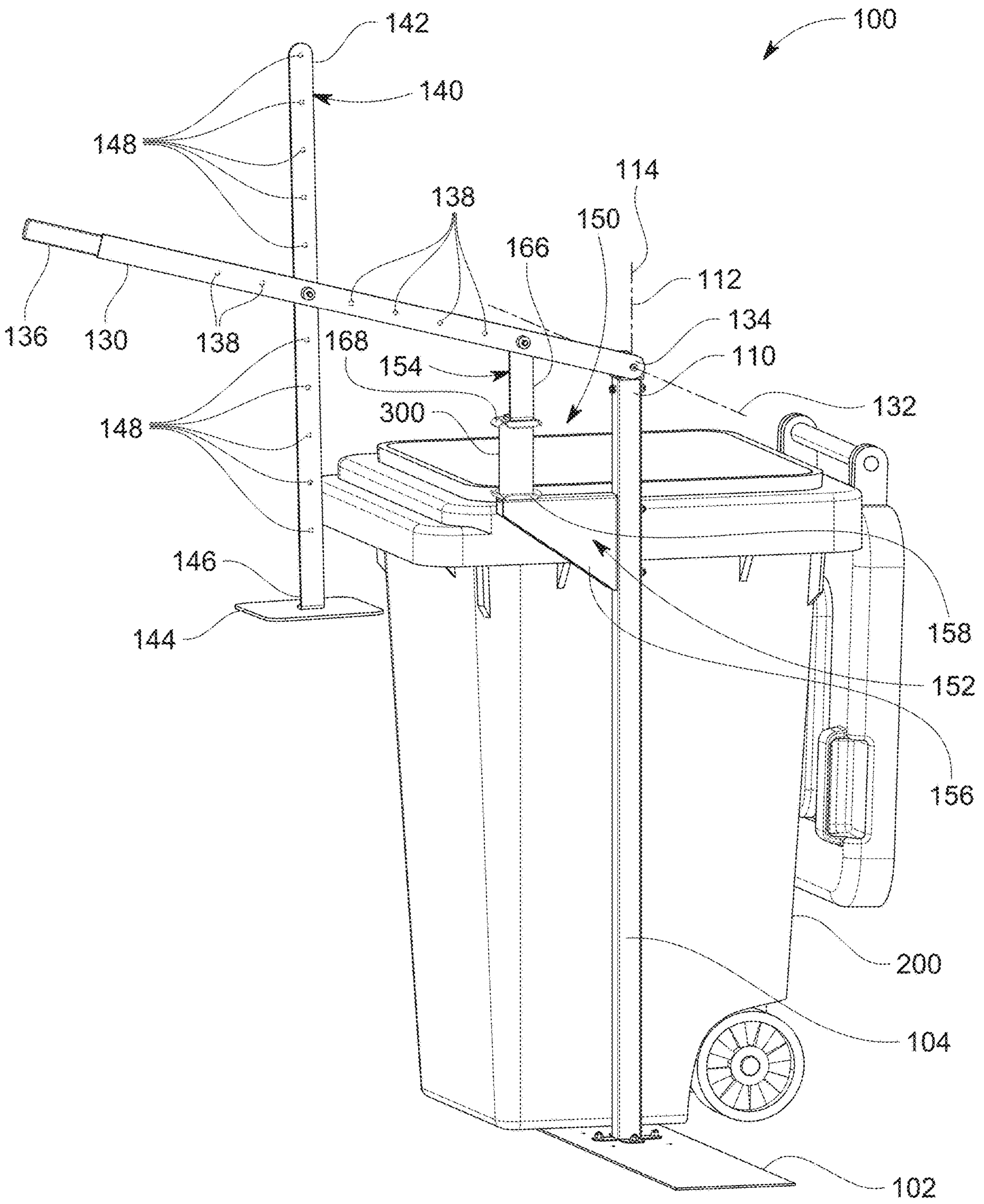
FIG. 2 illustrates a front perspective view of the waste compactor of FIG. 1 depicting the handle rotated by ninety degrees relative to a position of the handle in the FIG. 1 with a can arranged between a can crush assembly, in accordance with an embodiment of the present disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," "left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Referring to FIGS. 1 to 4, a waste compactor 100 is shown according to example embodiments of the disclosure. The waste compactor 100 includes a base plate 102 configured to support the waste compactor 100 on a surface, for example, ground surface, an elongated rod 104 extending vertically upwardly and substantially perpendicularly to the base plate 102. In the illustrated embodiment, the rod 104 is arranged substantially centrally to the base plate 102, and accordingly, the base plate 102 extends on both sides of the elongated rod 104. Further, the waster compactor 100 includes a bracket 108 arranged at an upper end 110 of the rod 104, and rotatably coupled to the rod 104. The bracket 108 is adapted to rotate, relative to the rod 104, about a vertical axis 112 that extends substantially parallel to a central axis 114 of the rod 104. In the illustrated embodiment, the vertical axis 112 is aligned with the central axis 114 of the rod 104, and hence the bracket 108 rotates about the central axis 144 of the rod 104.

Figure 4:
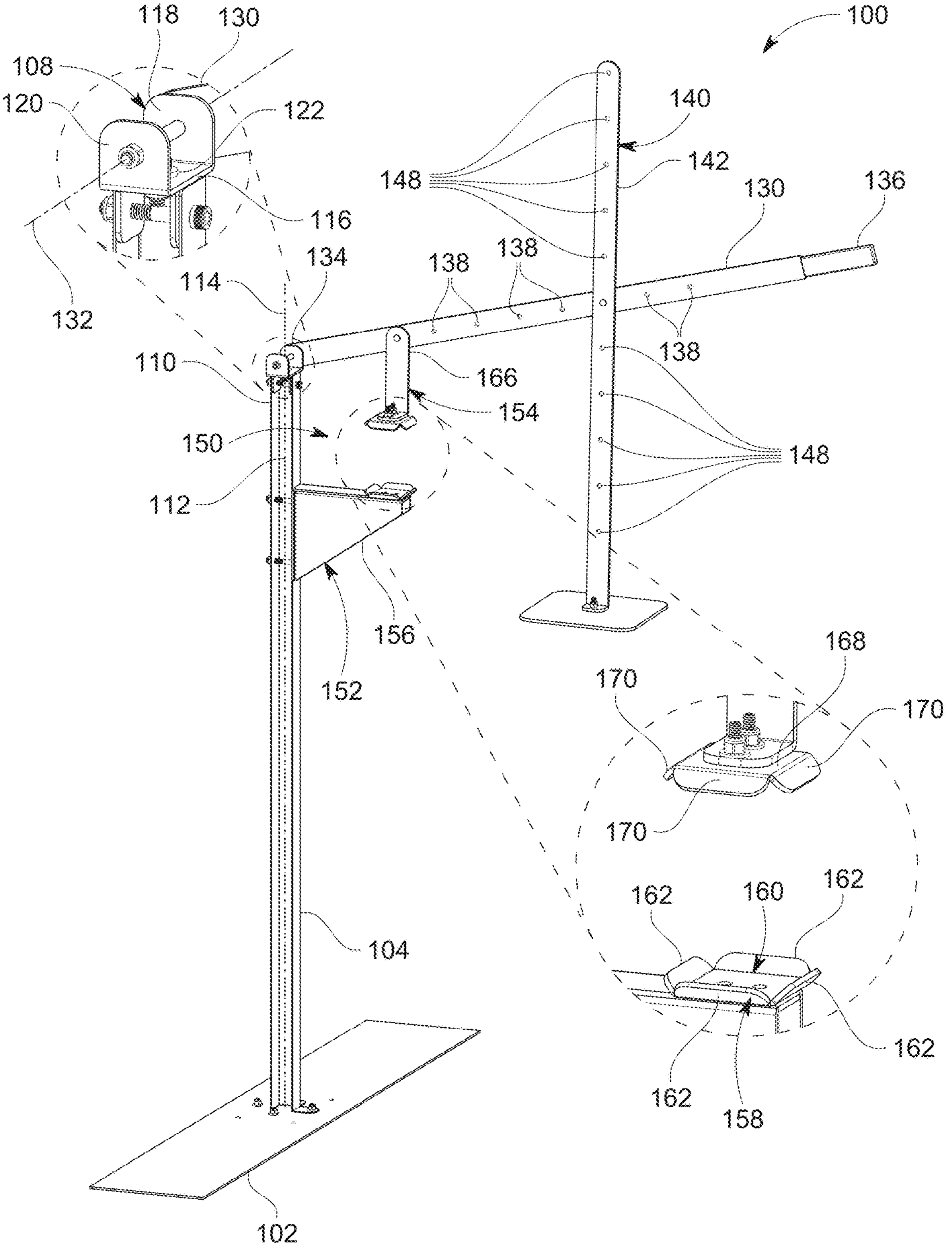
FIG. 4 illustrates a perspective view of the waste compactor depicting enlarged view of a portion of the can crush assembly, in accordance with an embodiment of the present disclosure.

As best shown in FIG. 4, the bracket 108 includes substantially U-shaped structure having a bottom plate 116 engaged/connected/coupled to the rod 104 and a pair of side plates 118, 120 extending vertically upwardly from the bottom plate 116. The side plates 118, 120 are arranged spaced apart and substantially parallel to each other. Also, in the illustrated embodiment, the bottom plate 116 is attached to the rod 104 via a screw 122 that extends in vertical direction through aligned holes of the bottom plate 116 and an upper plate of the rod 104. The screw 122 is arranged substantially centrally to the bottom plate 116, and bracket 108 rotates relative to the screw 122 about the central axis 114 that aligns with a central axis of the screw 122.

Moreover, the waste compactor 100 includes a handle 130 to be held by a user to operate the waste compactor 100 to compact the waste arranged inside a bin 200. The handle 130 pivotally attached to the bracket 108 and adapted to pivot about a pivot axis 132 between a raised position and a lowered position. As shown, the pivot axis 132 extends in a horizontal direction and is arranged substantially parallel to the ground surface. In the illustrated embodiment, the handle 130 includes a first end 134 that is pivotally engaged to the one of the side plates 118, 120, for example, the side plate 118, of the bracket 108, and a second end 136 arranged distally from the bracket 108. As shown, the handle 130 and the side plate 118 are attached to each other via a pin extending through the handle 130 and the side plate 118. Moreover, the handle 130 defines a plurality of slots 138 arrayed along a length of the handle 130 between the first end 134 and the second end 136. As the handle 130 is attached to the bracket 108, and the bracket is rotatably attached/coupled to the rod 104, the handle 130 is rotatably coupled to the rod 104 and is arranged to rotate about the vertical axis 112.

Further, to compress the waste disposed inside the bin 200, the waste compactor includes a plunger 140 attached to the handle 130 and having a plunger shaft 142 and a plunger plate 144 arranged at a lower end 146 of the plunger shaft 142 and attached to the plunger shaft 142. In the illustrated embodiment, the plunger shaft 142 extends or is arranged in a vertical direction and may extend substantially parallel to the rod 114. As shown, the plunger shaft 142 is removably coupled to the handle 130, and includes a plurality of holes 148 arrayed along a length of the plunger shaft 142.

The plunger shaft 142 i.e., the plunger 140 is removably attached to the handle 130 by aligning one of the holes 148 with one of the slots 138 of the handle and extending a pin through aligned hole 148 and slot 138. The plunger 140 is arranged to pivot relative to the handle 130 by a small angle. Accordingly, the plunger 140 moves up and down along a vertical line that is substantially perpendicular to the vertical axis 112 as the handle 130 is pivoted between the raised position and the lowered position for compacting the waste.

By having an array of holes 148, a length of the plunger shaft 142 that extends downwardly of the handle 130 may be changed/adjusted by changing the hole 148 of the plunger shaft 142 through which the pin extends. It may be appreciated that adjustability of a length of the plunger shaft 142 that extends downwardly of the handle 130 enables adjusting a height of the plunger plate 144 from the ground to enable the compression of waste filled to varying height in the bin 200. Similarly, a position a distance of the plunger 140 from the rod 104 may be changed by changing the slot 138 of the handle that aligns with a hole 148 of the plunger shaft 142 through which the pin extends to couple the handle 130 and the plunger shaft 142. This enables the use of the waste compactor 100 to compact the waster present in bins of varying sizes.

Additionally, the waste compactor 100 includes a can crusher assembly 150 to enable a user to crush empty metal or plastic cans 300. As shown, the can crusher assembly 150 includes a retention structure 152 attached to the rod 104 and extending in a horizontal direction from the rod 104, and a crusher 154 coupled to the handle 130 and extending in vertically downwardly from the handle 130. As shown, the retention structure 152 holds a can, and includes a cantilevered beam 156 extending in a horizontal direction from the rod 104 and is arranged substantially perpendicularly to the extension of the base plate 102 from rod 104. Accordingly, the rod 104, the base plate 102, and the beam 156 extend in three mutually perpendicular directions.

The beam 156 is arranged proximally to the upper end 110 of the rod 104.

Moreover, the retention structure 156 includes a holder 158 defining a cavity 160 to receive and hold the can in a vertically standing orientation. As shown, the holder 158 includes a plurality of projections 162 extending in the vertical direction and defining the cavity 158 therebetween to receive and hold the cans. The projections 162 surrounds and supports the can in the vertically standing orientation before and during crushing.

To crush the can, the crusher 154 is attached/connected/coupled to the handle 130, and is arranged proximally to the first end 134 of the handle 130. As shown, the crusher 154 is removably attached to the handle 130 via a pin. The crusher 154 is attached to pivot relative to the handle 130 by a small angle. Accordingly, the crusher 154 moves up and down along a vertical line that is substantially perpendicular to the vertical axis 112 as the handle 130 is pivoted between the raised position and the lowered position for crushing the can.

Figure 3:
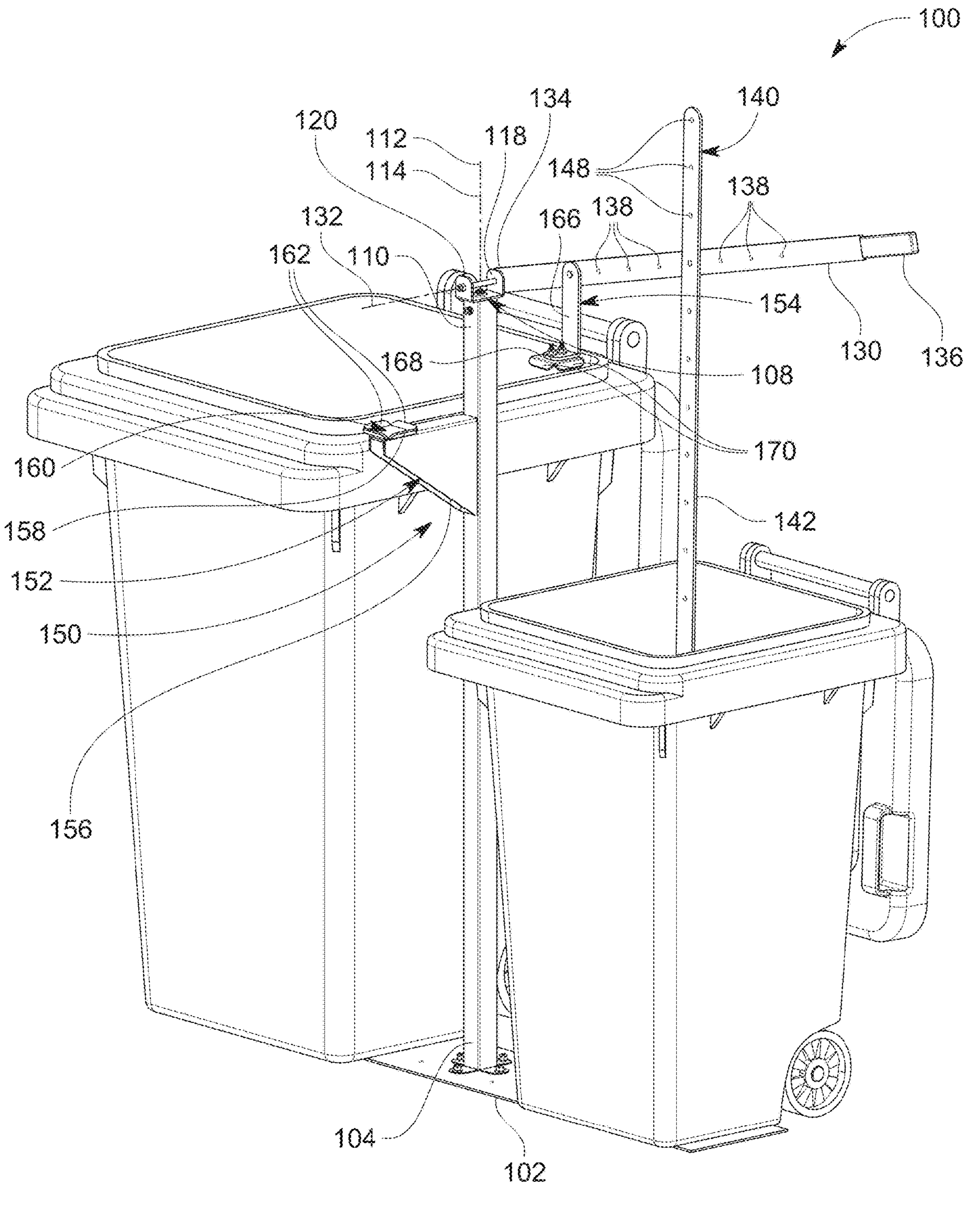
FIG. 3 illustrates a front perspective view of the waste compactor of FIG. 1 depicting the handle rotated one hundred and eighty degrees relative to the position of handle in FIG. 1 to compress waste present inside a bin positioned on a second side opposite to the first side of the rod, in accordance with an embodiment of the present disclosure.

As shown, the crusher 154 includes a substantially L-shape having a vertically oriented first plate 166 extending downwardly of the handle 130 and attached to the handle 130, and a horizontally oriented second plate 168 extending in a horizonal direction from the first plate 166. The second plate 168 is arranged to contact and crush the can 300, as shown in FIG. 3, arranged inside the holder 158 when the handle 130 is pivoted towards the lowered position from the raised position. It may be appreciated that the handle 130 is to be rotated about 90 degrees relative to the position of the handle 130 shown in FIG. 1 by rotating the bracket 108 relative to the rod 104 about the central axis 114. As best shown in FIG. 4, the crusher 154 may also include projection plates 170 extending vertically downwardly from the second plate 168 to hold and secure the can with the retention structure while crushing the can.

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications, and variances that fall within the scope of the appended claims. Further, the mere fact that different features are recited in mutually different dependent or independent claims does not indicate that a combination of these features cannot be advantageously used, such as a combination remaining within the scope of the aspects of the disclosed embodiments.

What is claimed is:

1. A waste compactor for compacting waste arranged inside a bin, the waste compactor comprising:

a rod extending in a vertical direction and the rod having a lower end supported on a ground surface;

a handle rotatably coupled to the rod and configured to rotate about a central axis of the rod, wherein the handle is pivotally coupled to the rod and configured to pivot about a pivot axis between a raised position and a lowered position, the pivot axis extends perpendicularly to the central axis;

a plunger coupled to the handle and is arranged to move in the vertical direction in response to the pivoting of the handle between the raised position and the lowered position to compress the waste disposed inside the bin; and a can crusher assembly attached to the rod and the handle, the can assembly configured to support and crush a can, wherein a rotation of the handle about the central axis of the rod configured to move the handle from a position for compacting waste inside the bin to a position to crush the can outside of the bin.

2. The waste compactor of claim 1 further including a bracket rotatably coupled to the rod and configured to rotate about the central axis of the rod, and the handle is pivotally engaged to the bracket to pivot about the pivot axis.

3. The waste compactor of claim 1, wherein the plunger includes a plunger shaft and a plunger plate attached to plunger shaft and arranged to contact and compress the waste in response to the pivoting of the handle to the lower position from the raised position.

4. The waste compactor of claim 3, wherein the plunger shaft defines a plurality of holes arrayed along a length of the plunger shaft, wherein the plurality of holes enables the coupling of the plunger shaft with the handle and facilitates an adjustment of a length of the plunger shaft extending downwardly of the handle.

5. The waste compactor of claim 1, wherein the handle defines a plurality of slots arrayed along a length of the handle to facilitate the coupling of the plunger with the handle, wherein the plurality of slots enables an adjustment of a position of the plunger relative to the rod in a horizontal direction.

6. The waste compactor of claim 1, wherein the can crusher assembly includes a retention structure attached to the rod and configured to retain the can in a vertically standing orientation, and a crusher attached to the handle and configured to move in the vertical direction in response to the pivoting of the handle between the raised position and the lowered position to contact and crush the can positioned on the retention structure.

7. The waste compactor of claim 6, wherein the retention structure includes a cantilevered beam extending in a horizontal direction from the rod, and a holder coupled to the beam to hold and retain the can.

8. The waste compactor of claim 7, wherein the holder includes a plurality of projections extending in the vertical direction and defining a cavity therebetween to receive and secure the can.

9. The waste compactor of claim 1 further comprising a base plate to support the rod on the ground surface, wherein the rod is attached to the base plate and extends in the vertical direction from the base plate.

10. A waste compactor for compacting waste arranged inside a bin, the waste compactor comprising:

a rod extending in a vertical direction and the rod having a lower end supported on a ground surface;

a handle rotatably coupled to the rod and configured to rotate about a central axis of the rod, wherein the handle is pivotally coupled to the rod and configured to pivot about a pivot axis between a raised position and a lowered position, the pivot axis extends perpendicularly to the central axis;

a plunger coupled to the handle and is arranged to move in the vertical direction in response to the pivoting of the handle between the raised position and the lowered position to compress the waste disposed inside the bin; and a can crusher assembly to support and crush a can, wherein the can crusher assembly includes a retention structure attached to the rod and configured to retain the can in a vertically standing orientation, and a crusher attached to the handle and configured to move in the vertical direction in response to the pivoting of the handle between the raised position and the lowered position to contact and crush the can positioned on the retention structure.

11. The waste compactor of claim 10 further including a bracket rotatably coupled to the rod and configured to rotate about the central axis of the rod, and the handle is pivotally engaged to the bracket to pivot about the pivot axis.

12. The waste compactor of claim 10, wherein the plunger includes a plunger shaft and a plunger plate attached to plunger shaft and arranged to contact and compress the waste in response to the pivoting of the handle to the lower position from the raised position.

13. The waste compactor of claim 12, wherein the plunger shaft defines a plurality of holes arrayed along a length of the plunger shaft, wherein the plurality of holes enables the coupling of the plunger shaft with the handle and facilitates an adjustment of a length of the plunger shaft extending downwardly of the handle.

14. The waste compactor of claim 10, wherein the handle defines a plurality of slots arrayed along a length of the handle to facilitate the coupling of the plunger with the handle, wherein the plurality of slots enables an adjustment of a position of the plunger relative to the rod in a horizontal direction.

15. The waste compactor of claim 10, wherein the retention structure includes a cantilevered beam extending in a horizontal direction from the rod, and a holder coupled to the beam to hold and retain the can.

16. The waste compactor of claim 15, wherein the holder includes a plurality of projections extending in the vertical direction and defining a cavity therebetween to receive and secure the can.

17. The waste compactor of claim 10 further comprising a base plate to support the rod on the ground surface, wherein the rod is attached to the base plate and extends in the vertical direction from the base plate.

* * * * *